Feb. 19, 1929.  1,702,645
A. EHRLICH
STEERAGE OF WINGED AIRCRAFT
Filed May 12, 1927
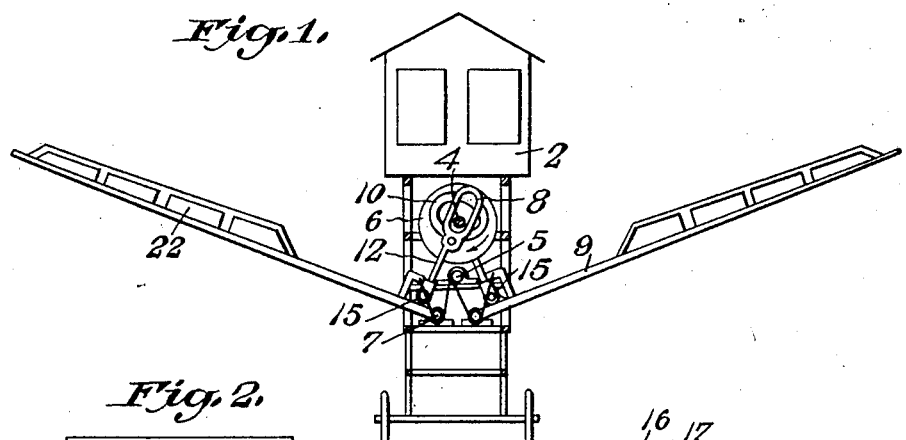
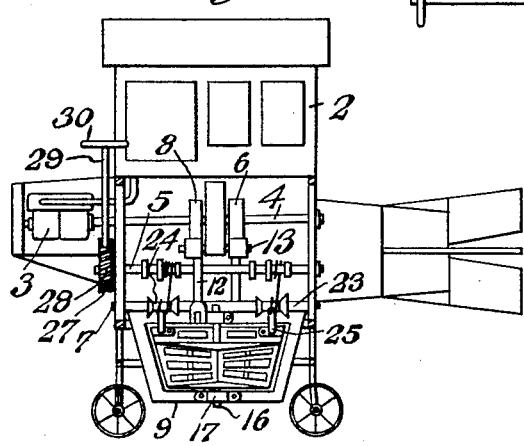
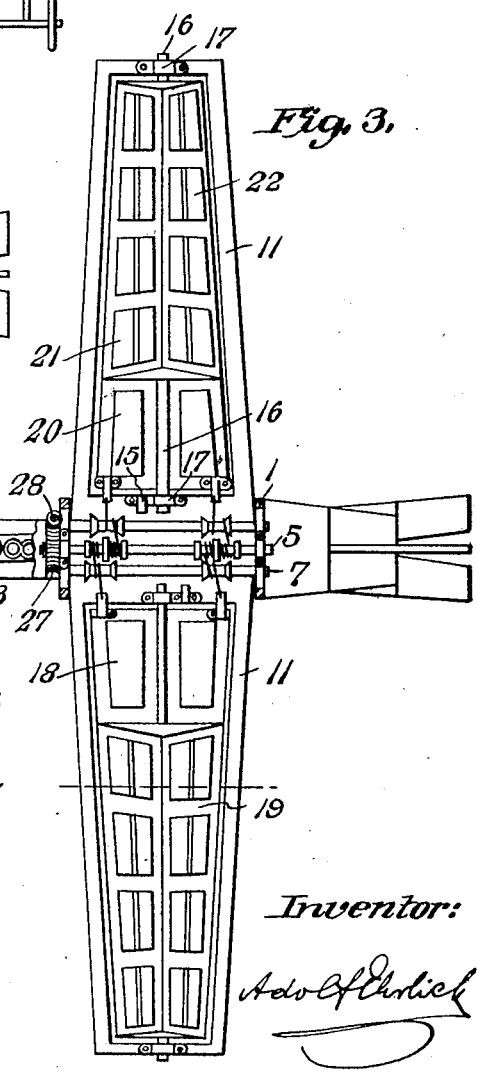
Inventor:
Adolf Ehrlich Patented Feb. 19, 1929.

1,702,645

UNITED STATES PATENT OFFICE.

ADOLF EHRLICH, OF BUDAPEST, HUNGARY.

STEERAGE OF WINGED AIRCRAFT.

Application filed May 12, 1927. Serial No. 190,850.

My invention relates to aircrafts with swinging wings and has for its object an improvement of the steerage and of the stability of such aircrafts, and also the elimination of the propeller for the rearward movement.

Aircrafts with half roof shaped wings, the supporting surfaces sloping forwards and downwards, can ascend and descend vertically only when, at the expense of the stability of the aircraft, the front part of the aircraft be raised, so as to set the originally inclined surface horizontal, for the rearward movement of such aircraft a special small propeller being required. Another drawback of the half roof shaped swinging wings is the circumstance that, both wing shafts remaining in a common horizontal plane, the ratio of the horizontal component of the force acting upon the lower wing surface to the vertical component of the same force is ever unaltered though on the way of the floating aircraft it is often desirable for enhancing the carrying capacity of the aircraft to augment the lifting part of the motor force at the expense of its forward moving horizontal part or inversely to enhance the speed of the aircraft by augmenting the horizontal component at the expense of the carrying capacity which depends upon the vertical component of the motor force.

According to the present invention the pilot of the floating aircraft is capable to give the supporting surfaces, both wing shafts remaining in a common horizontal plane, i. e. without troubling the stability of the aircraft, any required inclination, and that forwardly as well as backwardly, and set them too parallel to the direction of the flight. The backwards sloping swinging wing renders the use of any propeller dispensible whereby also the part of the motor force producing the air whirls will be spared and the noise caused by said whirls eliminated.

In the following detailed description the invention is described with reference to the accompanying drawings.

Figure 1 is a front elevation of the aircraft, for example with one pair of wings, partly in section.

Figure 2 is a side elevation, showing the left side wing in a swinging phase below the horizontal.

Figure 3 is a plan after removal of the cabin and of the rearwardly extended motor shaft.

Figure 4 is a side view in a relatively enlarged scale of the steering device showing the right side wing in the forwardly and the downwardly inclined position.

The framework 1, carries at the top the cabin 2, lower down the motor 3. To the rearwardly extended motor shaft 4 is secured the groove disc 6. Underneath the motor shaft 4 and parallel thereto a single longitudinal shaft 5, turning in bearings of the framework 1 is arranged. Below the single shaft 5 runs in a common horizontal plane parallel to the shafts 4 and 5 the two shafts 7 for the wings 9.

On each side of the groove disc 6 a driving rod 12 engages by means on an extending pin surrounded by a roller with the groove 10 formed on the respective side face of said groove disc. The free end 8 of said driving rod 12 is enlarged and provided with a longitudinal slot, so that this can embrace by means of a roller and slide upon the main shaft 4 of the motor 3. The lower end of said driving rod is hinged to a short projection 15 projecting upwardly from the wing 9 near its shaft 7.

Each wing 9 consists of a flat frame portion 11 and of a specially shaped middle portion 14, which within the space enclosed by the frame 11 is rotatable about the transverse axis 16 in bearings 17 of the frame shaped flat portion 11 of the wing 9. The rotatable internal wing portion 14 has an internal plain part 18, and an external roof shaped part 19. The plain internal part 18 is provided with large and uncovered recesses 20 which render the downward view from the cabin possible, whereas the recesses 21 formed on both sloping surfaces of the roof shaped part 19 of the rotatable middle wing portion 14 are covered with flaps 22 which open only downwardly. The entire wing 9 is linked by means of the hinge 23 to the shaft 7, said hinge being interrupted by two rollers 24 sitting on the shaft 7. Opposite each of said rollers 24 a post 25 extends upwards from the flat part 18 of the respective rotatable wing portion 14. To the top end of each post 25 one end of a wire rope 26 is attached. Said wire rope embraces an opposite roller 24 of the shaft 7 and runs thence upwardly to the single shaft 5, and, encircling said shaft with many coils, is attached thereto. In this way indirectly from the single shaft 5 two wire ropes run each to a respective post 25 extending upwards from the flat part 18 of the rotatable wing portion 14 of a swinging wing 9, one of said wire ropes being the front rope 26 attached to the top of the front post 25, the other being the rear wire rope attached to the respective rear post 25. The front and the rear wire rope of a wing are inversely wound upon the single shaft 5, so that, the shaft 5 being turned in one direction, one wire rope gets wound up whereas the other gets wound off. Owing to this arrangement the post 25 joined to the wire rope wound up pulls the respective transverse edge of the rotatable wing portion 14, producing in this way a corresponding inclination of said middle wing portion 14. Since the front wire ropes of a pair of wings are in a similar manner wound upon the shaft 5, the middle portions of both wings are always in the same manner inclined with reference to the respective frame portion of the wing. Turning the shaft 5 in the required direction, we may thus give at will both middle portions 14 of the pair of wings an indifferent position for the movement of the aircraft in the vertical direction, or give them a forwardly and downwardly directed inclination for securing the forward movement of the aircraft, and give them a backwards and downwards directed inclination for the rearwardly movement. For rotating from the pilot's seat the shaft 5, on the front end of said shaft a screw wheel 27 is keyed with which is engaged the screw 28. The ascending shaft 29 of said screw ends in front of the cabin with the steering hand wheel 30.

The pilot by turning the steering wheel may guide the flying aircraft in any required direction. The force delivered by the power engine of the flying aircraft acts upon the sloping supporting surfaces with two components directed at a right angle to each another, one of these components being the horizontal propulsing force, the other the vertical lifting force. As long as the angle of inclination of said surfaces is unaltered, the reciprocal proportions of both components remain the same, the sum of the squares of both components being, independently from said reciprocal proportion, always equal to the square of the entire force acting upon the inclined supporting surface. By altering the inclination of the swinging supporting surfaces, I may at will alter the reciprocal proportion of said components. The maximum lifting force results when the pilot, both wing shafts remaining in the common horizontal plane, sets the middle portion of the wing in the plane of the frame like wing portion, in which case the aircraft ascends, stays unmoved or descends slowly without advancing at all. The maximum of the propulsing component results when the rotatable middle portion of the wing forms an angle of 45° with the respective border portion 11, in which case half of the entire force acting upon the inclined surface serves to move the flying aircraft forwards, the other half lifting it. The angle formed by both wing portions of the uprightly floating aircraft being less than 45°, the lifting component increases, and the propulsing component adequately decreases, the sum of the squares of both components remaining equal to the square of the entire force acting upon the swinging slope, whereas in the case when both wing portions form an angle between 45° and 90° with each another, both the lifting and the propulsing component will decrease, both components, the lifting as well as the propulsing, disappearing entirely, if said wing portions form a right angle with each another.

The steerage of the winged aircraft remains the same if instead of one pair several wing pairs, swinging in alternating phases, be provided, in which case the front ropes of all the single wings are wound in a similar manner upon the common shaft 5 so as to raise or to lower simultaneously and in an equal degree the front edges of all notatable wing portions 14 if the hand wheel 30 be turned in the proper direction.

I am aware that other modifications besides those shown in the drawing may be found useful and lie within the scope of my invention.

What I claim as my invention and desire to secure by Letters Patent is:—

1. In an aircraft moved by means of swinging wings, each wing consisting of an external frame portion swinging about the respective horizontal wing shaft below the power engine, and of an internal portion filling out in its intermediate position the space of the frame portion, rotatably mounted about a transverse axis with reference to said frame portion, and means for rotating from the pilot's seat simultaneously and in the same degree the middle portions of all wings with reference to the respective frame portions.

2. In an aircraft with swinging wings, each wing consisting of a frame portion and of a middle portion rotatable about a transverse axis with reference to said frame portion, the middle portion having a roof shaped distant part and a flat proximate part, both sloping surfaces of said roof shaped part provided with recesses covered with flaps which open only downwardly, and means for altering at will from the pilot's seat simultaneously and in an equal degree the inclination on each wing of the middle wing portion with reference to the respective frame portion.

3. In an aircraft with swinging wings, each wing consisting of a frame portion and of a rotatable middle portion, posts extending upwards from near the front internal corner and from near the rear internal corner of each rotatable internal wing portion, one end of a wire rope attached to the top of each of said posts of the middle wing portion, the hinge of each wing opposite each of said posts interrupted by a roller sitting on the wing shaft, each wire rope surrounding with one coil an opposite roller of the wing shaft and thence ascending to a longitudinal single shaft mounted parallel to and above the wing shafts underneath the rearwards extended motor shaft, each wire rope being wound with several coils upon said single rope shaft and then attached thereto, all the wire ropes which are attached with one end to the front posts of the rotatable middle wing portions being wound in the same way upon said single rope shaft, and all the wire ropes which with one end are attached to the rear posts of the middle wing portions being wound upon the rope shaft with respect to the front ropes in an opposite way and means for rotating said rope shaft from the pilot's seat in the proper direction for altering simultaneously the inclination of all middle wing portions with reference to the respective frame portions of the wings.

In testimony whereof I have signed my name to this specification April, 1927.

ADOLF EHRLICH.